United States Patent
Crupi et al.

(10) Patent No.: US 10,423,620 B2
(45) Date of Patent: Sep. 24, 2019

(54) RUNTIME CREATION OF REMOTE DERIVED SOURCES FOR QUERY OFFLOAD

(71) Applicant: International Business Machines Corporation, Armonk, NY (US)

(72) Inventors: Gary W. Crupi, Pewaukee, WI (US); Shantan Kethireddy, Chicago, IL (US); Ruiping Li, San Jose, CA (US); David R. Trotter, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 327 days.

(21) Appl. No.: 15/494,478

(22) Filed: Apr. 22, 2017

(65) Prior Publication Data

US 2018/0307728 A1 Oct. 25, 2018

(51) Int. Cl.
*G06F 16/2453* (2019.01)
*G06F 16/2455* (2019.01)
*G06F 16/27* (2019.01)
*H04L 29/08* (2006.01)

(52) U.S. Cl.
CPC .. *G06F 16/24549* (2019.01); *G06F 16/24553* (2019.01); *G06F 16/27* (2019.01); *H04L 67/10* (2013.01)

(58) Field of Classification Search
CPC ............ G06F 16/24549; G06F 16/27; G06F 16/24553; H04L 67/10
USPC ........................................................ 707/713
See application file for complete search history.

(56) References Cited

U.S. PATENT DOCUMENTS

| | | | |
|---|---|---|---|
| 6,366,903 B1* | 4/2002 | Agrawal | G06F 16/24539 |
| 6,513,029 B1* | 1/2003 | Agrawal | G06F 16/2228 |
| 6,760,724 B1* | 7/2004 | Chakrabarti | G06F 16/2462 |
| 7,668,804 B1* | 2/2010 | El-Helw | G06F 16/248 |
| | | | 707/719 |
| 7,689,538 B2 | 3/2010 | Li et al. | |
| 7,840,553 B2* | 11/2010 | Lawande | G06F 16/24539 |
| | | | 707/714 |
| 8,768,973 B2* | 7/2014 | Hagenbuch | G06F 9/5083 |
| | | | 707/803 |
| 9,418,134 B2 | 8/2016 | Cadarette et al. | |
| 9,558,255 B2 | 1/2017 | Cadarette et al. | |
| 2002/0123979 A1* | 9/2002 | Chaudhuri | G06F 16/2462 |

(Continued)

OTHER PUBLICATIONS

Mistry et al., "Materialized View Selection and Maintenance Using Multi-Query Optimization", Proceedings of the 2001 ACM SIGMOD International Conference on Management of Data, Santa Barbara, CA, USA, May 21-24, 2001, pp. 307-318. (Year: 2001).*

(Continued)

*Primary Examiner* — Phuong Thao Cao
(74) *Attorney, Agent, or Firm* — Lee Law, PLLC; Christopher B. Lee

(57) ABSTRACT

A central relational database management system (RDBMS) is operatively interconnected to one or more back-end database systems. A set of different query criteria specified for each of different types of queries for a mixed query workload is evaluated. At least one remote derived source of data requested by at least one of the different types of queries is dynamically created using at least one of the one or more back-end database systems that supports remote processing of the at least one of the different types of queries.

20 Claims, 5 Drawing Sheets

(56) References Cited

U.S. PATENT DOCUMENTS

| | | | |
|---|---|---|---|
| 2002/0124001 A1* | 9/2002 | Chaudhuri | G06F 16/2462 |
| 2003/0093408 A1* | 5/2003 | Brown | G06F 16/2272 |
| 2007/0061287 A1* | 3/2007 | Le | G06F 16/24539 |
| 2007/0083489 A1* | 4/2007 | Lawande | G06F 16/24539 |
| 2007/0174292 A1* | 7/2007 | Li | G06F 16/24539 |
| 2007/0250524 A1* | 10/2007 | Le | G06F 16/2433 |
| 2008/0120304 A1* | 5/2008 | Calio | G06F 16/2386 |
| 2008/0177700 A1* | 7/2008 | Li | G06F 16/22 |
| 2009/0077075 A1* | 3/2009 | Bent | G06F 16/256 |
| 2009/0177697 A1* | 7/2009 | Gao | G06F 16/24539 |
| 2011/0196857 A1* | 8/2011 | Chen | G06F 16/24539 707/714 |
| 2012/0158723 A1* | 6/2012 | Wu | G06F 16/2471 707/737 |
| 2012/0278344 A1* | 11/2012 | Berg | G06F 16/24552 707/754 |
| 2013/0159286 A1* | 6/2013 | Manzano Macho | G06F 16/24542 707/718 |
| 2015/0032763 A1 | 1/2015 | Marwah et al. | |
| 2016/0132557 A1* | 5/2016 | Konik | G06F 16/24539 707/717 |
| 2016/0140177 A1 | 5/2016 | Chamberlin et al. | |
| 2016/0267161 A1 | 9/2016 | Cadarette et al. | |
| 2017/0149870 A1* | 5/2017 | Arnold | H04L 67/101 |

OTHER PUBLICATIONS

Perez et al., "History-Aware Query Optimization with Materialized Intermediate Views", 2014 IEEE 30th International Conference on Data Engineering, Chicago, IL, USA, Mar. 31-Apr. 4, 2014, IEEE, pp. 520-531. (Year: 2014).*

* cited by examiner

US 10,423,620 B2

RUNTIME CREATION OF REMOTE DERIVED SOURCES FOR QUERY OFFLOAD

BACKGROUND

The present invention relates to real-time database performance improvement. More particularly, the present invention relates to runtime creation of remote derived sources for query offload.

Databases provide for storage, organization, and retrieval of data. Relational databases organize data elements within tables, and utilize row and column identifiers to access different storage locations within the tables for data element storage and retrieval.

SUMMARY

A computer-implemented method includes, by a processor of a central relational database management system (RDBMS) operatively interconnected to one or more back-end database systems: evaluating, for a mixed query workload that comprises different types of queries, a plurality of different query criteria specified for each of the different types of queries; and dynamically creating for at least one of the different types of queries, based upon the evaluation of the plurality of different query criteria specified for each of the different types of queries of the mixed query workload, at least one remote derived source of data requested by the at least one of the different types of queries using at least one of the one or more back-end database systems that supports remote processing of the at least one of the different types of queries.

A system that performs the computer-implemented method and a computer program product that causes a computer to perform the computer-implemented method are also described.

DETAILED DESCRIPTION

Figure 1:
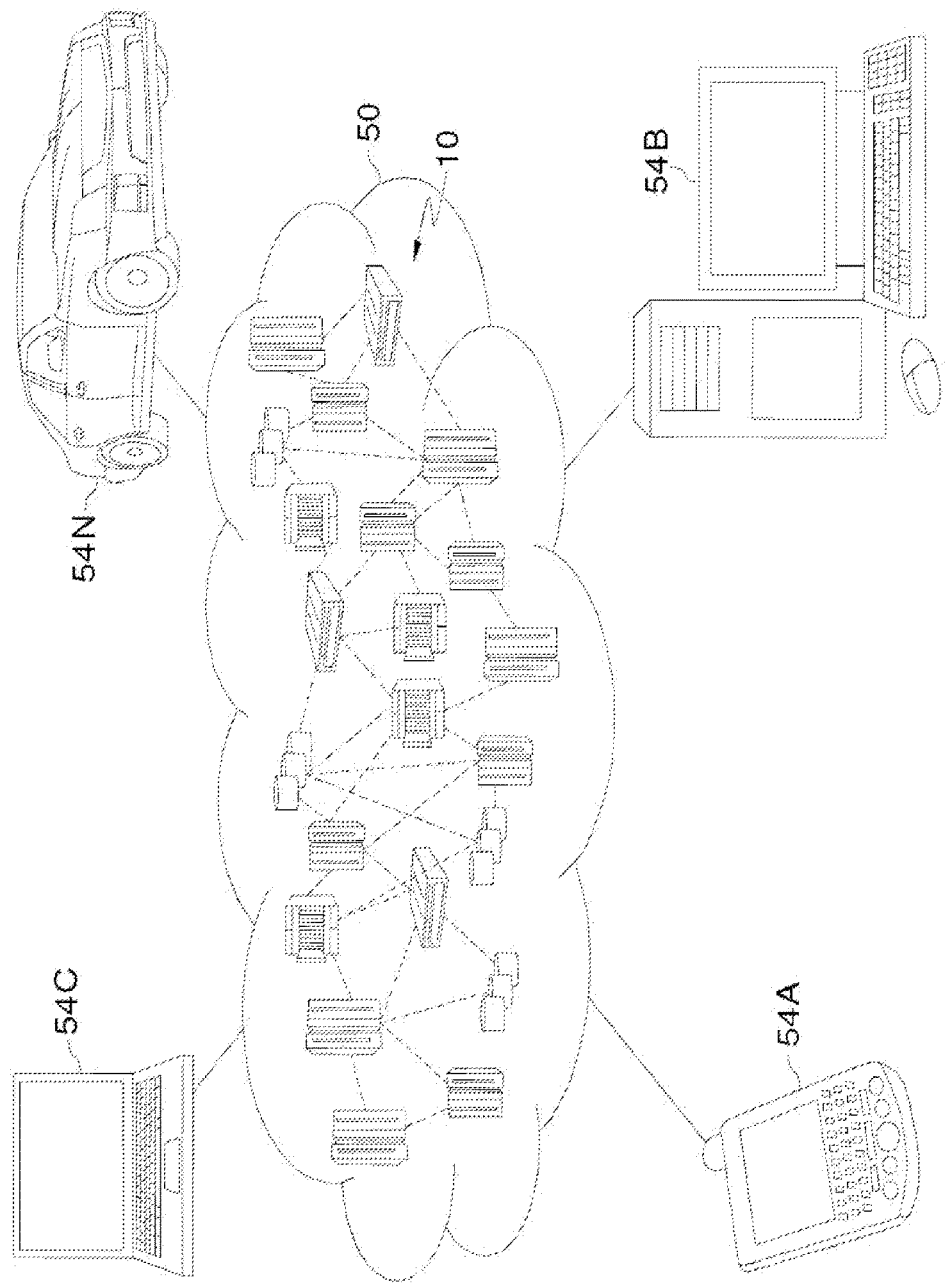
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides runtime creation of remote derived sources for query offload. The present technology solves a recognized real-time database performance problem by providing technology that includes a new form of relational database management system (RDBMS) processing that distributes data according to real-time workload/queries for improved runtime data access processing within complex distributed computing environments. The new technology described herein operates by creating remote data sources on back-end servers for query offload. The creation of the remote data sources (alternatively termed "remote derived sources") may be leveraged to improve database performance in circumstances, such as mixed query workloads, that may involve varying latency, security, and cost requirements/specifications. The present technology solves these recognized real-time database performance problems by automatically creating (or recommending the creation of) remote derived sources based upon multiple criteria. The criteria may include, among others, application latency requirements, service level agreement (SLA) requirements (e.g., user-defined requirements), security requirements, and cost requirements. In some implementations, in addition to creating/recommending remote derived sources, the system may automatically route workloads to the created remote derived sources based on these and other types of performance and other criteria specified in association with the routed workloads.

For purposes of the description herein, the terms "remote derived source" and "derived source" are used interchangeably and represent an operational source of data, and are considered a completely functional system with a copy of specific data to which queries may be independently routed and processed. Further, a "primary source" and similar terms as used herein refer to a principal data source/system from which remote derived sources may be created by replication of data and use of functional operations in those remote derived sources to process queries. The replication of data may be performed using continuous replication or using bulk load operations. For purposes of the present description, remote derived sources are also considered to be synchronized from a data perspective according to a variety of real-time constraints. As such, a remote derived source or a derived source, as those terms are defined herein, is different from an index or other general form of data structure that points to or that references data at a different source/location, and is different from a database that stores data but for which the stored data is not real-time synchronized with another database. To further differentiate a remote derived source as described herein from an index, an index is a structure built from a primary source, where the index contains key values and pointers to locations within the primary source at which to find data. The index structure is different from that of the underlying primary source because the index is a different object. A remote source, in contrast, is another copy of the primary source or is a materialization of content from several primary sources. The remote derived sources described herein may be synchronized in real time (using incremental refresh capabilities) or may be bulk synchronized at various intervals (e.g., through an unload utility). The synchronization decision may be driven by the application owner's data latency requirements.

The technology described herein operates by a processor of a central relational database management system (RDBMS) operatively interconnected to one or more back-end database systems evaluating, for a mixed query workload that involves different types of queries, a plurality of different query criteria specified for each of the different types of queries. The processor dynamically creates for at least one of the different types of queries, based upon the evaluation of the plurality of different query criteria specified for each of the different types of queries of the mixed query workload, at least one remote derived source of data requested by the at least one of the different types of queries using at least one of the one or more back-end database systems that supports remote processing of the at least one of the different types of queries.

As such, the technology described herein automates (or advises in an alternative implementation) the creation of remote derived sources based upon objectives, such as data latency, time/cost to refresh remote derived sources, functionality supported by back-end systems, and other SLA's. The creation of remote derived sources in back-end systems attached to a central mechanism, such as a central RDBMS or federation server, is a threshold action to allow that central mechanism to route workloads to these back-end systems. An example of a central RDBMS and a back-end system is a DB2® database program for a z/OS® operating system connected to an IBM® DB2® database program Analytics Accelerator, respectively.

The technology described herein provides a central service for advising, automating, and maintaining these "remote derived sources" in one of multiple available back-end database servers, where the advice/creation of these remote derived sources is influenced by several "remote derived source creation factors." These remote derived source creation factors may include, among others, remote derived source fit for purpose factors, which may be implemented using a cost-based optimization. Costs that may be optimized within this context represent an aggregate return on investment specified for allowing runtime creation of a remote derived source based upon pricing of various tools, licenses for which fees are paid based upon consumption, and other cost-related factors associated with creation and use of a particular remote derived source. The remote derived source fit for purpose factors may further include structured query language (SQL) support, availability of hardware resources, current central processing unit (CPU) utilization, concurrent queries being executed and query queue length, availability of requisite base data for creation of the remote derived source, remote derived source metadata (e.g., base tables raw record count, selectivity of predicates, column cardinality, data skew, filter factors, etc.), and remote derived source availability.

The remote derived source creation factors may further include latency tolerance of the application, cost of replicating or bulk load of remote derived source base data to the remote system, evaluation of the plan cache or static SQL packages or extract/transform/load (ETL) flows to find remote derived source opportunities (common table expressions, sub-queries, etc.), aggregate return on investment (ROI) of the remote derived source, SLA requirements of the application including security requirements (e.g. EAL5, self encrypting drives, etc.), elapsed time requirements, cost of environment, and fail-back requirements.

For purposes of the description herein, ETL (Extract, Transform, Load) and ELT (Extract, Load, Transform) are different. ETL implies doing work off platform in an ETL server environment. In contrast, ELT means describing an ETL process as structured query language (SQL) so it may be run entirely in a database management system (DBMS) without pulling the data to an ETL server.

It should be noted that conception of the present subject matter resulted from recognition of certain limitations associated with conventional database performance. For example, it was observed that information management (IM) system users encounter problems with developing a consolidated cost-effective environment capable of running mixed-query workloads that have varying specified requirements of latency, security, and cost. It was further observed that because these mixed-query workloads include both transactional and analytical aspects, these mixed-query workloads impose increased demands on system performance for real-time processing. To address this issue, IM system users conventionally create separate, custom platforms that fit the service level agreement (SLA) requirements and budget of the various applications in use. It was determined that this customized approach results in inefficient duplication of both hardware and software resources, with a coincident inefficiency of use of these different resources, because a typical system is not one hundred percent (100%) occupied from a central processing unit (CPU) utilization perspective. Further, this approach causes the various applications to each use their own "siloed" environment, and requires routing of workloads using application-level logic. It was determined that the use of application-level logic for routing was inefficient and reduced application-level performance. Additionally, it was observed that each environment typically requires a completely separate set of data source credentials, which was also determined to be inefficient and to reduce system resource utilization efficiency and performance because credentials had to be stored and processed in each separate siloed environment. It was further determined that application-level routing criteria are difficult to maintain and aggregate once created, which leads to security risks due to an ever-expanding number of credentials that must be duplicated and redundantly managed. It was further observed that data integration and data movement difficulties in these conventional systems also caused IM system users to lose confidence in their data integrity because documentation of changes, if any documentation exists at all, becomes obfuscated over time. Additionally, there is no conventional approach to compute the costs of moving data, whether real-time costs or system utilization costs, due to the complexity of the underlying system interconnections. It was also observed that cloud vendors and managed service providers are encountering similar challenges, and that they conventionally carve out a relational database management system (RDBMS) environment to handle the query workload. Because of varying SLAs, security, and budgetary requirements in the mixed-query workloads, these entities have to either conventionally segregate the workloads based on the SLA and route each workload to a separate cloud managed environment (imposing security issues and additional cost from separate people/process/infrastructure), or conventionally route all workloads to the same environment (which is inefficient across varying workloads). It was additionally observed that such scaling by adding additional platform resources to manage these varied loads is cost prohibitive and that certain resources become underutilized across these types of redundant systems due to inefficiencies of scale.

From these many observations, it was determined that it would be desirable for cloud vendors and managed service providers to offer single interfaces within which queries may be dynamically routed by a central RDBMS or federation server to separate environments based on user-defined SLA settings and other criteria. It was further determined that in order for a central RDBMS or federation server to route different query workloads to one of multiple back-end systems, the respective portions of the data of interest must exist on (be migrated to) those different systems to allow those systems to autonomously process queries. Additionally, it was determined that the SLA requirements of the application must be described to the central RDBMS or federation server in a manner that allows these devices to autonomously migrate and access differing data sets. It was further determined that new technology that allows federation to be a choice, but not the only means, and to have the flexibility and ability to create additional information and objects would improve mixed-query performance across systems and platforms.

The technology described herein automates and/or advises the creation and maintenance of remote derived sources by looking at plan cache/static structured query language (SQL) packages and extract/transform/load (ETL) flows to determine fit for purpose of back-end systems based on cost, application latency requirements, aggregate return on investment (ROI) of the remote derived source, and other SLAs. The technology described herein may improve runtime mixed workload query processing performance within a complex computing environment by creating remote derived sources to independently process, in parallel, queries against a given data set. The technology described herein further improves utilization and operational efficiency of heterogeneous resources across a distributed platform by creating remote derived sources within systems that have available/underutilized processing bandwidth and/or storage, and may coincidently reduce costs of hardware and software deployment over time. As such, the subject matter described herein improves database performance by providing for runtime creation of remote derived sources for query offload, as described above and in more detail below. As such, improved database performance may be obtained through use of the present technology.

The runtime creation of remote derived sources for query offload described herein may be performed in real time to allow prompt creation and use of remote derived sources. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

To carry out the technological performance improvements of database platforms described above, the technology described herein determines the appropriateness of creating remote derived sources across multiple heterogeneous environments based upon an ability of central systems (e.g., central RDBMS or federation server) to relay workloads to those systems while taking into account application-level latency goals and costs of moving data to those systems (e.g., real-time data movement and tool/licensing costs). Further, as a query is received, a determination may be made in real time as to whether the individual query is a candidate for re-routing based upon SLAs specified for the query and the real-time capability of the heterogeneous system that hosts a remote derived source to handle the workload (at that time).

The following portion of the present description assumes a central RDBMS operates as a primary source with one-to-N (1-to-N) back-end database servers that may be used for query offload. Further, a system administrator/user may specify various constraints by which the central RDBMS may make decisions and/or recommendations for remote derived source creation. It should be noted that the details of the particular back-end systems may be considered "unknown" to an end user that is establishing the various constraints under which the present technology operates. As such, the present technology may be considered well suited for systems such as outsourced or cloud computing environments (as detailed further below) where the details of such systems are not known.

A remote derived source optimizer component (hereinafter "optimizer," "optimizer component," or "central RDBMS optimizer" for ease of reference) may implement the technology described herein, such as within a central RDBMS or elsewhere within a complex system, as appropriate for a given implementation. The description herein utilizes the term "central RDBMS" to expedite description of the technical processing. The central RDBMS is considered the "primary source" of data relative to remote derived sources. It is understood that the central RDBMS described herein operates in a new manner relative to conventional RDBMS systems because of the optimizer component that is described herein. As such, the central RDBMS described herein may not be interpreted as a conventional RDBMS because the inclusion of the optimizer component described herein results in a new form of RDBMS with new functionality, as described herein.

It should be understood that the optimizer component may operate autonomously to implement the technology as described in detail herein. However, as appropriate for a given implementation, the optimizer component may, as an alternative, convey one or more decisions for remote derived source creation to be confirmed by an administrator prior to creating a remote derived source. This form of processing may be considered a remote derived source confirmation feedback loop, and may be considered configurable/selectable within the optimizer component or may be implemented as an alternative to autonomous processing by the optimizer component.

An advisor component (hereinafter alternatively "advisor") provides a selectable service and interface for such a remote derived source confirmation feedback loop. The advisor component may propose data to be established and migrated to one or more remote back-end systems. The advisor component may provide suggestions to the administrator/user, and may receive confirmations from the administrator of remote derived source suggestions prior to carrying out the technical processing of creating a remote derived source. The advisor may specify a refresh rate for the data, and may specify the "value" of creating remote derived sources at the specific back-end systems to the administrator. The specified value may be provided in terms of real-time query processing performance improvement and/or cost savings predicted to result from creation of the remote derived source. As such, an administrator may be presented with reasoning by which the optimizer component believes creation of a remote derived source would benefit performance of query processing (e.g., again the "value" in the forms of performance improvement, cost reduction, or other metrics as appropriate for a given implementation).

The advisor may be incorporated into the optimizer or may be implemented separately, as appropriate for a given implementation. The two components will be described interchangeably for ease of reference below with particular functional differences specified where appropriate. Additionally, the advisor may provide suggestions regarding data locations/migrations, or may perform automated data migration to establish remote derived sources in conjunction with or as part of the optimizer, again as appropriate for a given implementation.

The following description first describes how a central RDBMS (again, that includes the optimizer component) may determine if queries may be routed/re-routed based upon user-specified query requirements (e.g., security, data latency, high availability (HA) of data, etc.). The following paragraphs will also describe how the user may specify these query requirements. It should be noted that, in order to route workloads to a back-end system, the underlying data must exist within or be migrated to all of the back-end systems to which the queries may be routed. The following details specify how latency requirements may be described to the central RDBMS by the user and then matched by the central RDBMS for use in creating or recommending remote derived sources.

Regarding the technical processing of the central RDBMS optimizer, the optimizer operates according to a process that improves RDMBS performance. To summarize the detailed description that follows, within a configuration phase the optimizer allows specification of user-defined application latency tolerances (hereinafter "phase 1"). The optimizer then evaluates groups of queries and identifies remote derived source opportunities (hereinafter "phase 2"). The optimizer determines candidates from a set of remote systems for potential use as remote derived sources (hereinafter "phase 3"). The optimizer groups those candidate sources by latency requirement group (hereinafter alternatively "latency group") based upon latency tolerance, and may supply/define refresh requirements/periodicity for each remote derived source (hereinafter "phase 4"). The optimizer may expose the cost to maintain (refresh the data of) each remote derived source, may expose the queries that would benefit from a particular remote derived source, and may suggest the back-end system in which the remote derived source has been or should be created (hereinafter "phase 5"). The optimizer may further evaluate extract/load/transform (ELT) flows to create/advise remote derived sources (hereinafter "phase 6"). The optimizer may then operate to form/create one or more remote derived sources (hereinafter "phase 7"). The optimizer may also and alternatively route workloads to created remote derived sources based on application defined SLAs (hereinafter "phase 8").

It should be noted that while certain phases are listed herein using sequential numerals for ease of reference below, sequential processing of these different phases is not required because many of these processing phases may be performed in parallel. Sequential operations that may be useful even though not required include determining any constraints associated with identifying and establishing remote derived sources, and actually establishing the remote derived sources prior to routing a query to the remote derived sources. However, it should further be noted that constraints may be utilized in real time as they are entered as well as expanded and altered over time, and that instructions to a back-end system to cause it to operate as a remote derived source may be transmitted with the data along with a first query to be executed against the remote derived source. As such, many opportunities for parallel processing may exist and be utilized as appropriate for a given implementation.

Within "phase 1" of the technical runtime processing introduced above regarding user-defined application latency tolerances, users may define application-level latency tolerances globally for all applications, at a sub-system level, at a connection level, according to a secondary authority identifier (ID), at a query level, or otherwise as appropriate for a given implementation. Latency requirements may also be set for groups of applications. Example latency specifications may include real time, less than sixty seconds (<60 seconds), less than one hour (<1 hr), less than one day (<1 day), or otherwise as appropriate for a given implementation. Application latency requirements may also be specified at various levels. Example latency levels include a query level, a Java® database connectively/open database connectivity (JDBC/ODBC) connection level, profile table level, or globally (e.g., for a given logical partition (LPAR), subsystem, or data sharing group). The central RDBMS may use these application-level latency requirements to create and refresh, or advise creation and refresh, of remote derived sources.

Within "phase 2" of the technical runtime processing introduced above, the central RDBMS optimizer steps/iterates through a central query repository or static package plans, and identifies remote derived source opportunities. The optimizer may step through such a central query repository (e.g. dynamic statement cache, static package, etc.) or analyze a single query to look for remote derived source opportunities. Unlike conventional materialized query table (MQT) advisor technologies, the following differentiators are essential to advising appropriate remote derived sources both in a user-managed and a cloud-managed environment.

One differentiator is that the technology described herein takes into account user-defined application latency tolerances, as detailed above and further below. Another differentiator is that the technology described herein takes into account user-defined SLA metrics. The optimizer may aggregate user-defined SLA requirements to determine whether any "attached" remote environment is appropriate for deployment of a remote derived source.

Aside from these application-level requirements, and as additional differentiators, the optimizer may also look at query heuristics and query complexity to determine whether to create or advise creation of remote derived sources. This processing may be performed by evaluation of an entire query or a query block, as appropriate for a given level of complexity of a given query. For example, the advisor may look for sub-queries, common table expressions, union query blocks, star join re-writes, and other information to identify remote derived source opportunities. The advisor may evaluate account statistics, including rows scanned, rows returned, predicate selectivity, CPU cost, estimated run time, and other information to determine the complexity of a given query block. The advisor may estimate the CPU and elapsed time to run on available remote derived sources. Individualized code within the advisor component may be implemented for each heterogeneous remote derived source to estimate CPU/elapsed time and to determine whether an SQL is supported by the given remote derived source.

Within "phase 3" of the technical runtime processing, the central RDBMS optimizer determines candidates for remote derived source creation based on back-end database "derived source support criteria." Derived source support criteria represent remote system functionality and infrastructure that support creation of a remote derived source, and may include SQL support, data type support, character coding support, and other derived source support criteria as appropriate for a given implementation. Once processing has been completed to identify candidates for creation of remote derived sources, one or more of those candidates may be selected for creation of a remote derived source.

The optimizer component described herein adds an ability to perform several additional technical sets of processing actions within a distributed database platform that performs runtime creation of remote derived sources. The following several paragraphs detail these additional technical sets of processing actions. It should be noted that, as part of phase "7" described further below, the optimizer component may perform the following actions in real-time responsive to identification of suitable candidates for remote derived source creation and management. Alternatively, the optimizer component may advise the creation for implementation by other components as appropriate for a given implementation. The following description is presented with the optimizer component performing the determination/identification of the various processing tasks, with the understanding that these processing details may be performed in real time within a complex distributed multi-RDBMS system/platform to improve the runtime creation of remote derived sources for query offload or to advise the creation of remote derived sources, as appropriate for the given implementation.

As a first set technical processing action, the optimizer component may identify remote derived sources for query offload. The off-loaded queries may be materialized queries. Materialized queries may be identified as a remote derived source that represents a query with join/grouping/sorting/aggregate/local selection of a set of tables (e.g., tables a, b, c). Alternatively, these types of materialized queries may be identified "as" the tables involved in a query, such that the remote derived sources "are" the set of tables (e.g., tables a, b, c) and the join/grouping/sorting/aggregate of the remote derived sources (e.g., again tables a, b, c) may occur at execution time on the remote derived source (e.g., the tables).

Remote derived sources may be identified based not only upon syntax supported by the back-end RDBMS (already supported by the respective AoTs), but also based upon several additional constraints. For example, remote derived sources may be identified based upon user defined latency requirements, cost to maintain a remote derived source, number and complexity of queries that may be offloaded if a remote derived source is created, resources available on the target systems (e.g., thresholds for storage capacity, average queue length, average CPU usage, etc.), and other user defined SLA settings. The description below elaborates upon certain of these additional constraints.

The optimizer component may further perform real-time processing of remote derived sources. For example, the optimizer component may autonomously identify, create, and utilize remote derived sources without intervention. The real-time processing aspects of remote derived sources are described in more detail below in phase "7."

To continue with the description of identification of remote derived sources, when many different queries may benefit by having copies of each table and when a query-specific materialization for various ones of these queries may be created relatively quickly on the back-end system, the optimizer component may create single-table remote derived sources (e.g., again table copies) instead of a query-specific materialized table. To again further this example, it is presumed that three tables (e.g., tables a, b, and c) exist in a primary source. Where there is one very long-running query to be executed (e.g., select min(c1), sum (c2) from a, b, c where . . . group by c3, c4), the optimizer component may create a remote derived source that matches this query statement exactly. This may be particularly advantageous where no or limited other queries request this data, when a particular query is run a few times but is very costly to run, or if a particular query is run many times and is slightly costly or costly to run.

Alternatively, if there are many disparate queries that request elements of these three tables (e.g., a, b, and c) in various formats and the query-specific materialization of those queries is relatively inexpensive (e.g., creation of a billion-row materialized table in less than thirty (<30) seconds), then the optimizer component may suggest/create three (3) remote derived sources (e.g., table a, table b, and table c) and let the grouping/aggregate/join happen at execution time for the individual queries. As another alternative, where materialization is very expensive, rather than doing all of the materializations on one system, the materialization may be spread out to many back-end database systems. Materialization at execution time maximizes flexibility. By just having the three (3) tables, the workload may be spread out irrespective of whether materialization is costly or is not costly.

Within "phase 4" of the technical processing introduced above, the central RDBMS optimizer component may also determine/group candidates for remote derived source creation based upon latency tolerance and may supply/define refresh requirements/periodicity for each remote derived source. A remote derived source candidate may be placed within multiple latency requirement groups (e.g., may be in a latency group of real time, as well as in a latency group of less than one hour (<1 hr)). The optimizer may also maintain the number of queries that a specific remote derived source may be used with for each latency group within which the remote derived source is placed, as well as the total CPU cost and elapsed time for those queries. The numbers of queries may be specified using variables and relative values. For example, remote derived source one (1) may be used by "X" queries if the latency is less than one hour (<1 hr), may be used by "X+Y" queries if the latency is less than sixty seconds (<60 seconds), and may be used by "X+Y+Z" queries if the latency is real time.

Alternatively and in furtherance of this example, if the value of the variable "X" is small, and the total CPU/elapsed time for those "X" queries is small, the optimizer strategically may make a determination not to create or recommend this remote derived source to be created with one hour (1 hr) latency. This may change if the value of the variable "X" is small, but the total CPU or run time is large (e.g., small number of queries but expensive from a CPU/run time perspective). This may also change if the value of the variable "X" is quite large. Similarly if the value of the variable "Z" is small (e.g., the number of queries in the real time group is not much greater than in the less than sixty seconds (<60 seconds) group) and the combined value of the variables "X+Y" is large (e.g., the number of queries in the less than sixty second (<60 seconds) group is large), then the optimizer may create or recommend creating a remote derived source on a back-end system that may be maintained at least every sixty (60) seconds. For real time queries, the optimizer may use the primary source system since the value of the variable "Z" is small in this example. Alternatively, if the value of the variable "Z" is substantial and there are back-end systems that support real-time, then the optimizer may create real-time remote derived sources.

The remote derived source may also be instructed to maintain information that identifies the respective remote derived source and detailed information regarding maintenance of the remote derived source. For example, the remote derived source may maintain a last refresh timestamp, a maximum refresh delta (e.g., maxRefreshDelta), or other statistics that document performance and maintenance of created remote derived sources. In this way, the optimizer may determine whether a remote derived source may be used at execution time, or whether bind time use of a remote derived source is a more appropriate time for a given remote derived source.

The optimizer may gather the maintenance information from the remote derived sources, may create/maintain a table regarding each remote derived source, and may generate such a table as part of a recommendation for creation of a remote derived source (to a system administrator). The table may include the remote derived source (e.g., specified according to the query/queries operative on the remote derived source), such as "select min(c1), sum (c2) from a, b, c where . . . group by c3, c4." The table may further include a back-end server identifier that specifies where the remote derived source is located, the number of queries processed by each remote derived source, the maximum latency experienced, the aggregate estimated CPU cost reduction(s), the aggregate estimated elapsed cost reduction(s), the reload method (e.g., change data capture (CDC), bulk load, real time, etc.), and other information as appropriate for a given implementation. The table may further specify a "value" in terms of performance improvement and/or cost reduction for the creation of remote derived sources.

Within "phase 5" of the technical runtime processing introduced above, the central RDBMS optimizer may further expose the cost to maintain (refresh the data) of each remote derived source, may expose the queries that would benefit from a particular remote derived source, and may suggest the back-end system in which the remote derived source has been or should be created. This processing allows the optimizer to provide documentation of performance improvements, cost reductions, and other technical benefits obtained by remote derived source creation. Regarding the cost to maintain remote derived sources, is recognized that as latency requirements approach real time, the cost to maintain a remote derived source increases. Therefore, by exposing the cost to maintain remote derived sources, the optimizer may improve remote derived source creation/suggestion by evaluation of prior remote derived sources and by leveraging the maintenance costs for remote derived sources of differing query types to create new remote derived sources. In order to determine whether to create a remote derived source, the maintenance costs may be compared to a potential value. Because of the inherent complexity of "value," the optimizer considers more than aggregate potential CPU/elapsed time savings for all queries to which a particular remote derived source may be applicable. A single query may have multiple potential created/advised remote derived sources, and the query (or query block) may only be a candidate for re-route if all the remote derived sources are created with the same or lower latency tolerance in the same back-end system. By supplying each query that was used to advise a particular remote derived source, the optimizer may sort by longest running or most CPU-intensive queries, and may determine what other remote derived sources have been created/advised for that query.

Additionally, there may be multiple heterogeneous back-end sources. In such a case, the optimizer may take into account that there may be multiple heterogeneous back-end sources. Each of the back-end sources may support varying data copying methods from the central RDBMS to the back-end systems. Various options may include continuous replication, utility based bulk load, a standalone tool that does bulk load or flash copy, and other replication options. The replication options may depend upon the source/target, various data copying methods, and tools that are available. With the created remote derived source, the advisor may also supply an identifier of the particular target back-end system. If there are multiple connected back-end appliances, the optimizer may suggest one or many target back-end systems (for example if continuous replication is setup for one back-end system and not another, then the system with continuous replication may be used if appropriate for that implementation).

Additionally, where an environment offers workload manager/management (WLM) policies for workloads within each of a central system and multiple back-end systems, either end may support WLM policies and priorities. These priority levels may also be used to determine if a remote derived source may actually be created and maintained at the desired latency level. For example, if remote workloads are marked "discretionary" and bulk load estimates are approaching the specified latency tolerance, then the optimizer may not create/advise that particular remote derived source. Similarly, the optimizer may use WLM policies and back-end system usage data (e.g., CPU utilization, queue length, wait times, etc.) to determine refresh rates and times to be specified for a particular remote derived source.

Within "phase 6" of the technical runtime processing introduced above, the central RDBMS optimizer may further evaluate extract/load/transform (ELT) flows to create/advise remote derived sources. For example, remote derived sources, such as AoTs, may benefit from in-database ELT processing. The optimizer component described herein may be utilized to allow a central RDBMS to determine a "fit for purpose" of an attached back-end system for handling ELT logic through remote derived sources. For example, if an ETL flow has CPU-intensive logic that is executed against a large volume of data (e.g., billions of rows), and the latency requirement for the ELT flow is twenty four (24) hours (e.g., nightly ETL process), then an ELT remote derived source may be created to independently process this type of ELT flow. Because ELT logic may be broken down into query blocks, the optimizer may also expose data on the query block level for evaluation of remote derived source efficiency.

Additionally, variations in costing may be utilized to evaluate remote derived sources. For example, some of the remote derived sources (e.g., various stages of the ELT flow) may occur all within the back-end system (e.g. IDAA). For these types of remote derived sources, there would be no data copy/transfer cost if all of the processing is on one back-end system. As such, because the cost in the central RDBMS (e.g., cost to CDC from a central RDBMS to a back-end system) may be different than the cost in the back-end system (e.g., cost to ELT all within the back-end system), the advisor may also supply information on which system is incurring that cost (e.g., thirty (30) CPU seconds may have a different meaning in a central RDBMS versus a back-end system from a direct cost perspective).

Within "phase 7" of the technical runtime processing introduced above, the central RDBMS optimizer may operate to form/create one or more remote derived sources. Creation of remote derived sources may include runtime copying/movement of data to an identified back-end system that is to be established as a remote derived source. Further, the optimizer may communicate with the back-end system to inform the back-end system of the specific types of queries that will be routed as part of this integrated service. The optimizer may perform any additional processing as appropriate to establish a useable/functional remote derived source.

The technical processing to create a remote derived source may be performed as appropriate for the given implementation. For example, where the DB2® database program is utilized, an implementation of an analytics accelerator may be used to create accelerator only tables (AoT) that are only accessible through the central RDBMS. An AoT is a remote derived source that is built off of a materialized query. Queries against these AoTs may be routed through the central RDBMS (DB2® database program for the z/OS® operating system) by the optimizer component described herein to the AoTs.

The optimizer component may automatically/programmatically create remote derived sources and may programmatically maintain these remote derived sources using any available maintenance appropriate for a given implementation. For example, where a DB2® database program is used, the z/OS® operating system provides several features that may be used for remote derived source maintenance activities, including change data capture (CDC) replication and utilization of bulk load at the table and partition level.

As introduced above, the optimizer component may further route workloads to remote derived sources based upon application-defined SLAs, and other criteria as appropriate for a given implementation. In this way, and in view of the description above, the optimizer component may autonomously identify, create, and utilize remote derived sources without intervention, and may manage remote derived sources over time including life-cycle management as appropriate for a given set of constraints and given environment within which remote derived sources are created (e.g., cost of creating remote derived sources versus benefits of remote derived sources over time, and changes to those benefits over time). As such, the autonomous operations of the optimizer component may identify and implement performance improvements, including real-time query performance, and may operate to reduce costs of query operations over time.

The optimizer component may vary the type of remote derived source according to query execution duration and varying uses of created remote derived sources. For example, the optimizer component may identify single table remote derived sources (e.g., table copies), or may identify query-specific materialized tables dependent upon query execution duration and varying usage of a created remote derived source.

Within "phase 8" of the technical runtime processing introduced above, the central RDBMS optimizer may also and alternatively route a workload to created remote derived sources based upon application defined SLAs. For example, in a cloud computing environment or in a managed service environment, clients may be given various options (SLAs) that define a client's expectations of the cloud/managed service provider for handling the client's workloads. These options may have different pricing schemes based upon batch performance, security, and other factors. The system of record (SoR) (e.g., a mortgage system, etc.) may create additional data sharing groups or add hardware to increase performance specified by the client's SLAs. Another option may be to attach a back-end database server to handle complex queries. However, these types of delegation/offloading of query processing may not be an option if the user requires a certain level of latency or requires a higher level of security that what is provided by the available back-end systems. As such, a cloud provider may attach a back-end system and offer opportunities to increase performance or reduce cost. The provider may expose SLA options and the user may define these options at the query, application, connection, logical partition (LPAR) or subsystem, or profile levels (e.g., Internet protocol (IP) address, authorized user identifier (ID), etc.).

The central RDBMS may offer additional application level SLA settings (beyond latency as described above) based upon what offload RDBMS environments the central RDBMS supports, and the quality of service (QoS) characteristics offered by those sources. For example, one back-end database may offer high availability, while another back-end database may offer medium to low availability, depending on objectives such as an average recovery time objective/recovery performance objective (RTO/RPO). Similarly, a particular back-end database may offer lower performance for select-type queries (e.g., CPU intensive queries that involve grouping/sorting/aggregating) than another back-end database offers, but may offer better performance for on-line transaction processing (OLTP) type queries. Where the central RDBMS has an option to choose one environment or another to execute a query (i.e., multiple environments are available, underlying data exists in those environments), the optimizer may choose the performance that matches what the end user has selected and paid for as part of their service level agreement.

Sample options that may be provided by the optimizer/advisory component may be granularly specified and determined by the corresponding support offered by the remote RDBMS and operating system. For example, requirements for remote access control facility (RACF), self encrypting drive support, encrypted network transmission, and others may all determine whether security supported by a given RDBMS source are to be categorized as high, medium, or low. These settings may be ascribed to a back-end system at the system level. However, the same SLAs may be assigned to an environment at other levels (e.g., LPAR).

Latency may be considered a significant barrier to use of back-end repositories for query offload. Where the workload is latency tolerant or the back-end systems contain real-time data (e.g., through mirroring or other appropriate technique), user-defined SLAs may also be used to determine fit for purpose of attached back-end systems. As such, the technology described herein reduces the barriers to the use of back-end repositories by use of runtime creation of remote derived sources for query offload based upon the variety of criteria and evaluation described above.

Several additional options may be provided for configuration of the optimizer component via a user interface. For example, high availability (HA), security level, performance, and disaster recovery expectations may be provided as options.

Regarding high availability (HA) options, high availability (HA) tiers may be specified as options. It should be noted that because HA is provided by the central source system, if a remote back-end system goes down, performance may degrade. As such, the end user may specify a particular HA option to ensure that back-end systems meet the same HA levels to meet expected performance. Example HA options include tier 1, tier 2, tier 3, or no back-end routing. The no back-end routing option again maintains all processing at the central RDBMS.

Regarding security level options, evaluation assurance levels (EAL), encryption at rest, and encryption in motion options may be selected. Example security options include high, medium, low, and no back-end routing. For example, a high security option may be considered a higher EAL level (e.g., EAL6 or EAL 7), with self-encrypting drives as the encryption at rest specification, and with network traffic encrypted as the encryption in motion specification. A medium security option may be considered an intermediate EAL level (e.g., EAL 4, EAL 5). A low security option may be considered a lower EAL level (e.g., EAL1-EAL3). The no back-end routing option again maintains all processing at the central RDBMS.

Regarding performance, example options may include maximum performance, lowest cost, and no back-end routing. In a situation where a cloud provider offers multiple back-end systems, the end user may choose maximum performance. However, that performance level may have an increased cost to the end user. A lowest-cost option may result in low performance.

Regarding disaster recovery expectations (e.g. worse case recovery commitment), several selectable options may also be provided. For example, tier 1 through tier 7, or again no back-end routing may be specified.

Additional options may include dynamic load balancing, cloud storage, regulatory data storage location requirements (e.g., consistent with regulatory rules that may prohibit certain types of data from being stored outside of a geographic region/country), and access to the data. Many other options for configuration of the optimizer/advisor component are possible, and all such options are considered within the scope of the present description.

As introduced above, the present technology may be implemented within or as part of a cloud computing environment (e.g., for data analytics), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
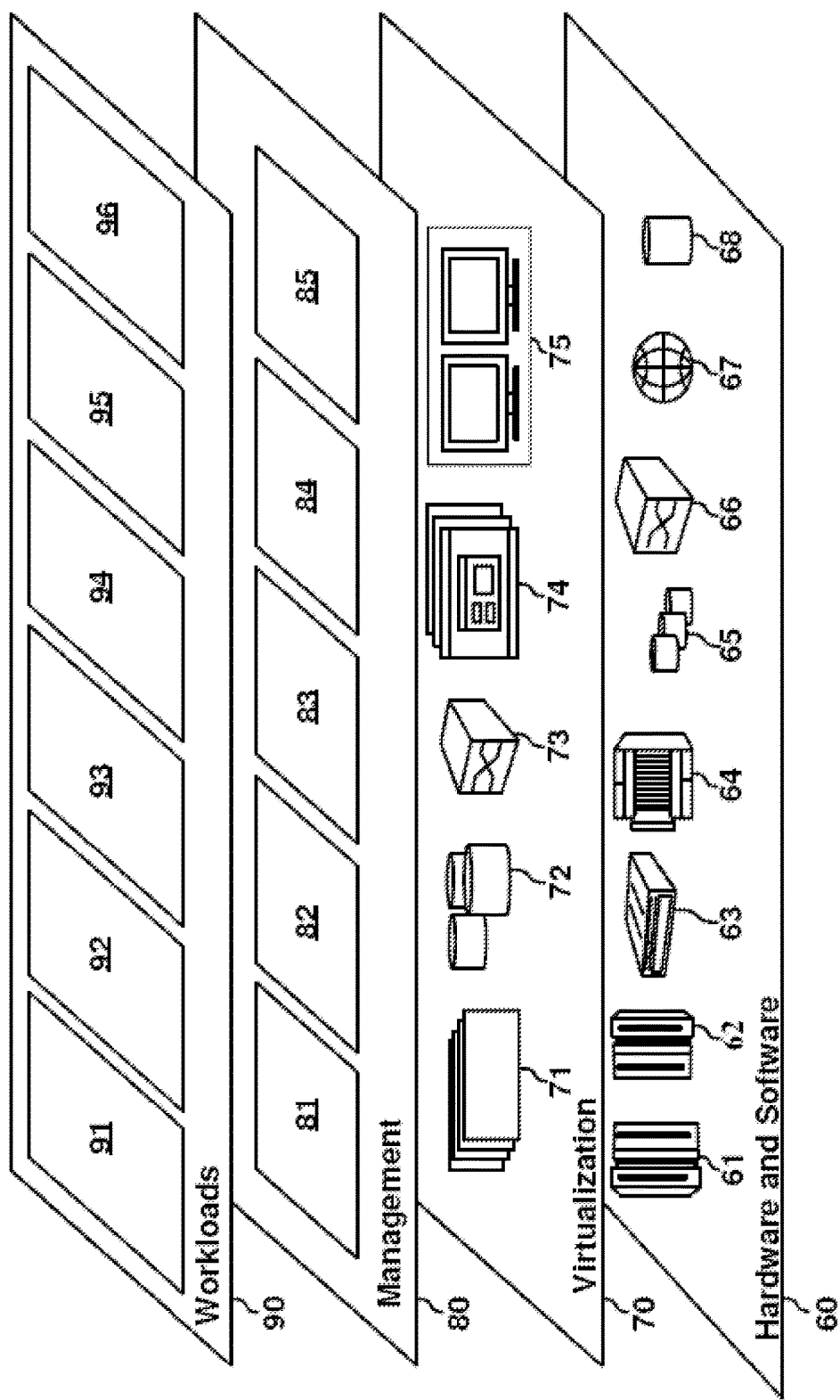
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and runtime creation of remote derived sources for query offload processing 96.

Figure 3:
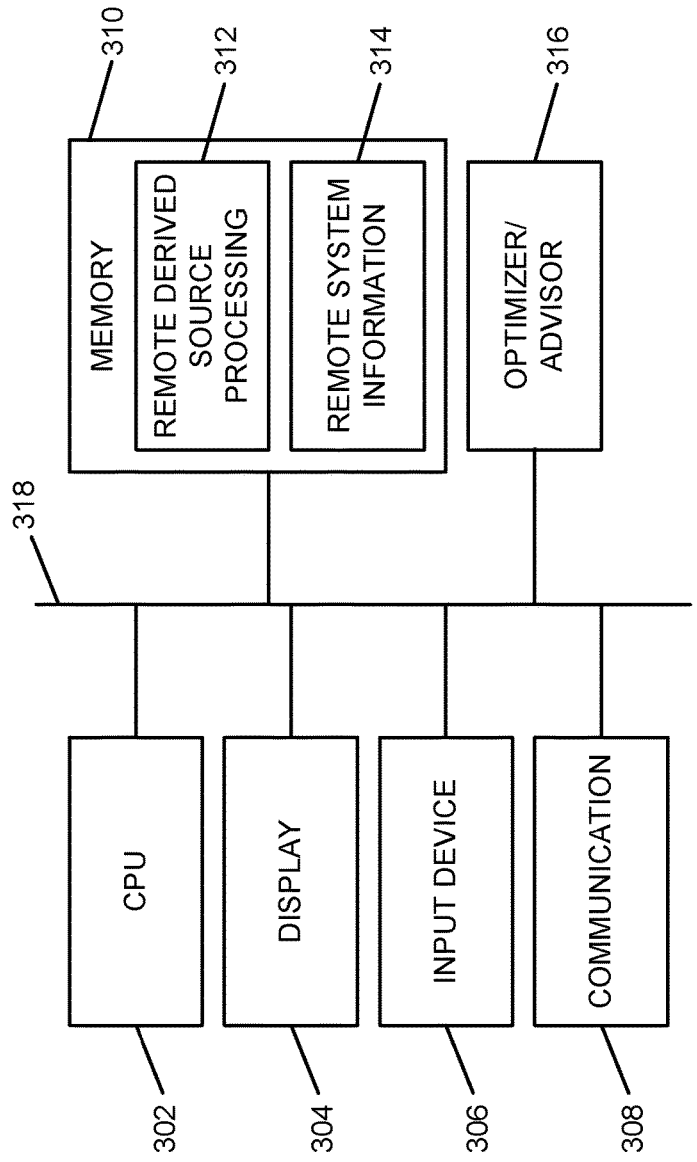
FIG. 3 is a block diagram of an example of an implementation of a core processing module capable of performing runtime creation of remote derived sources for query offload according to an embodiment of the present subject matter.

FIG. 3 is a block diagram of an example of an implementation of a core processing module 300 capable of performing runtime creation of remote derived sources for query offload. The core processing module 300 may be associated with the hardware and software layer 60 and implemented within any of the cloud computing nodes 10. As such, the core processing module 300 is described generally herein, though it is understood that many variations on implementation of the components within the core processing module 300 are possible and all such variations are within the scope of the present subject matter. Further, the core processing module 300 may be implemented as an embedded processing device with circuitry designed specifically to perform the processing described herein as appropriate for a given implementation.

Further, the core processing module 300 may provide different and complementary processing of runtime creation of remote derived sources for query offload in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 302 ("processor") provides hardware that performs computer instruction execution, computation, and other capabilities within the core processing module 300. A display 304 provides visual information to a user of the core processing module 300 and an input device 306 provides input capabilities for the user.

The display 304 may include any display device, such as a cathode ray tube (CRT), liquid crystal display (LCD), light emitting diode (LED), electronic ink displays, projection, touchscreen, or other display element or panel. The input device 306 may include a computer keyboard, a keypad, a mouse, a pen, a joystick, touchscreen, voice command processing unit, or any other type of input device by which the user may interact with and respond to information on the display 304.

A communication module 308 provides hardware, protocol stack processing, and interconnection capabilities that allow the core processing module 300 to communicate with other modules within the cloud computing environment 50. The communication module 308 may include any electrical, protocol, and protocol conversion capabilities useable to provide interconnection capabilities, as appropriate for a given implementation. As such, the communication module 308 represents a communication device capable of carrying out communications with other devices.

A memory 310 includes a remote derived source processing area 312 that stores information and criteria for determining whether to create/advise and/or maintain remote derived sources. The information and criteria may include any of the information described above (e.g., application-level latency requirements/SLAs, plan caches, static SQL packages, ETL flows, etc.), and any other information as appropriate for a given implementation. As described above and in more detail below, information and criteria stored within the remote derived source processing storage area 312 is used to identify opportunities for remote derived sources, and to create and manage remote derived sources.

The memory 310 also includes a remote system information storage area 314 that stores remote system information of remote systems that may be utilized to create remote derived sources. The remote system information may include hardware resource information (e.g., number of CPUs, real-time utilization, etc.), software resource information (e.g., supported query language, etc.), security level(s) supported by the remote systems, cost information related to use of resources at the respective remote systems, and other information as appropriate for the given implementation. The remote system information may also include details of created remote derived sources, in the form of tables or otherwise, that documents identifiers of the remote systems that currently host remote derived sources, details of the specific data that has been replicated for query, queries that may be offloaded to individual remote derived sources, data refresh protocol/frequency, and other information for created remote derived sources. The remote system information stored within the remote system information storage area 314 may be updated in real time to maintain an accurate and current view of available remote system resources for use in creation of remote derived sources and real-time routing/re-routing of queries to remote derived sources.

It is understood that the memory 310 may include any combination of volatile and non-volatile memory suitable for the intended purpose, distributed or localized as appropriate, and may include other memory segments not illustrated within the present example for ease of illustration purposes. For example, the memory 310 may include a code storage area, an operating system storage area, a code execution area, and a data area without departure from the scope of the present subject matter.

An optimizer/advisor module 316 is also illustrated. The optimizer/advisor module 316 provides processing for creation of and advising creation of remote derived sources for the core processing module 300, as described above and in more detail below. The optimizer/advisor module 316 implements the automated runtime creation of remote derived sources for query offload of the core processing module 300.

It should also be noted that the optimizer/advisor module 316 may form a portion of other circuitry described without departure from the scope of the present subject matter. The optimizer/advisor module 316 may form a portion of an interrupt service routine (ISR), a portion of an operating system, or a portion of an application without departure from the scope of the present subject matter. The optimizer/advisor module 316 may also include an embedded device with circuitry designed specifically to perform the processing described herein as appropriate for a given implementation.

The CPU 302, the display 304, the input device 306, the communication module 308, the memory 310, and the optimizer/advisor module 316 are interconnected via an interconnection 318. The interconnection 318 may include a system bus, a network, or any other interconnection capable of providing the respective components with suitable interconnection for the respective purpose.

Though the different modules illustrated within FIG. 3 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 300 is illustrated with and has certain components described, other modules and components may be associated with the core processing module 300 without departure from the scope of the present subject matter. Additionally, it should be noted that, while the core processing module 300 is described as a single device for ease of illustration purposes, the components within the core processing module 300 may be co-located or distributed and interconnected via a network without departure from the scope of the present subject matter. Many other possible arrangements for components of the core processing module 300 are possible and all are considered within the scope of the present subject matter. Accordingly, the core processing module 300 may take many forms and may be associated with many platforms.

Figure 4:
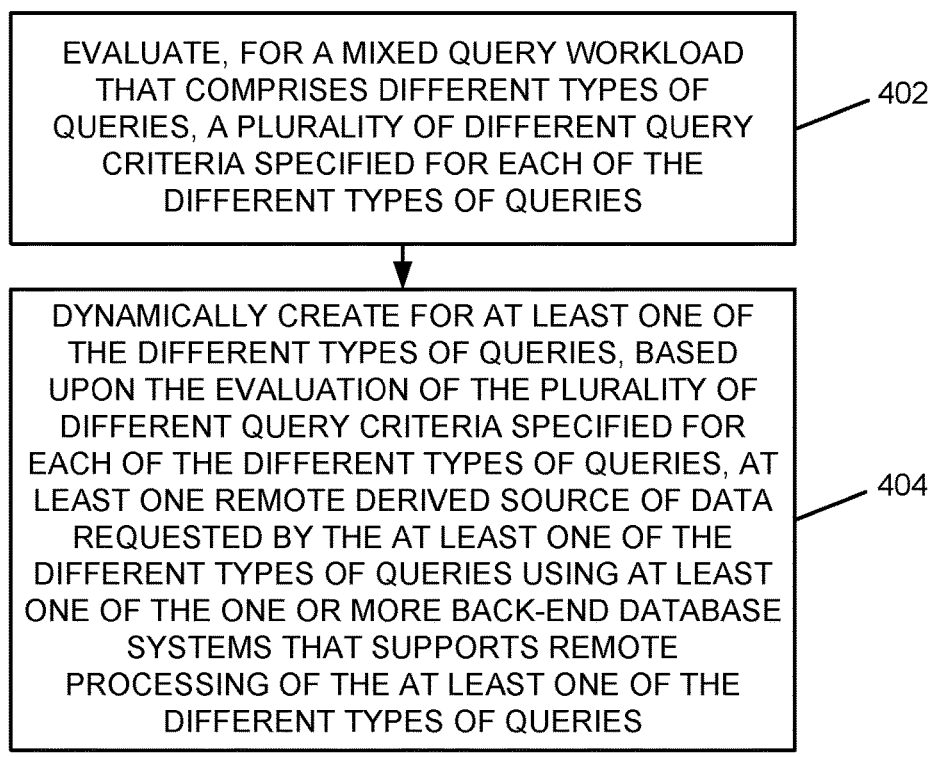
FIG. 4 is a flow chart of an example of an implementation of a process for automated runtime creation of remote derived sources for query offload according to an embodiment of the present subject matter.
Figure 5:
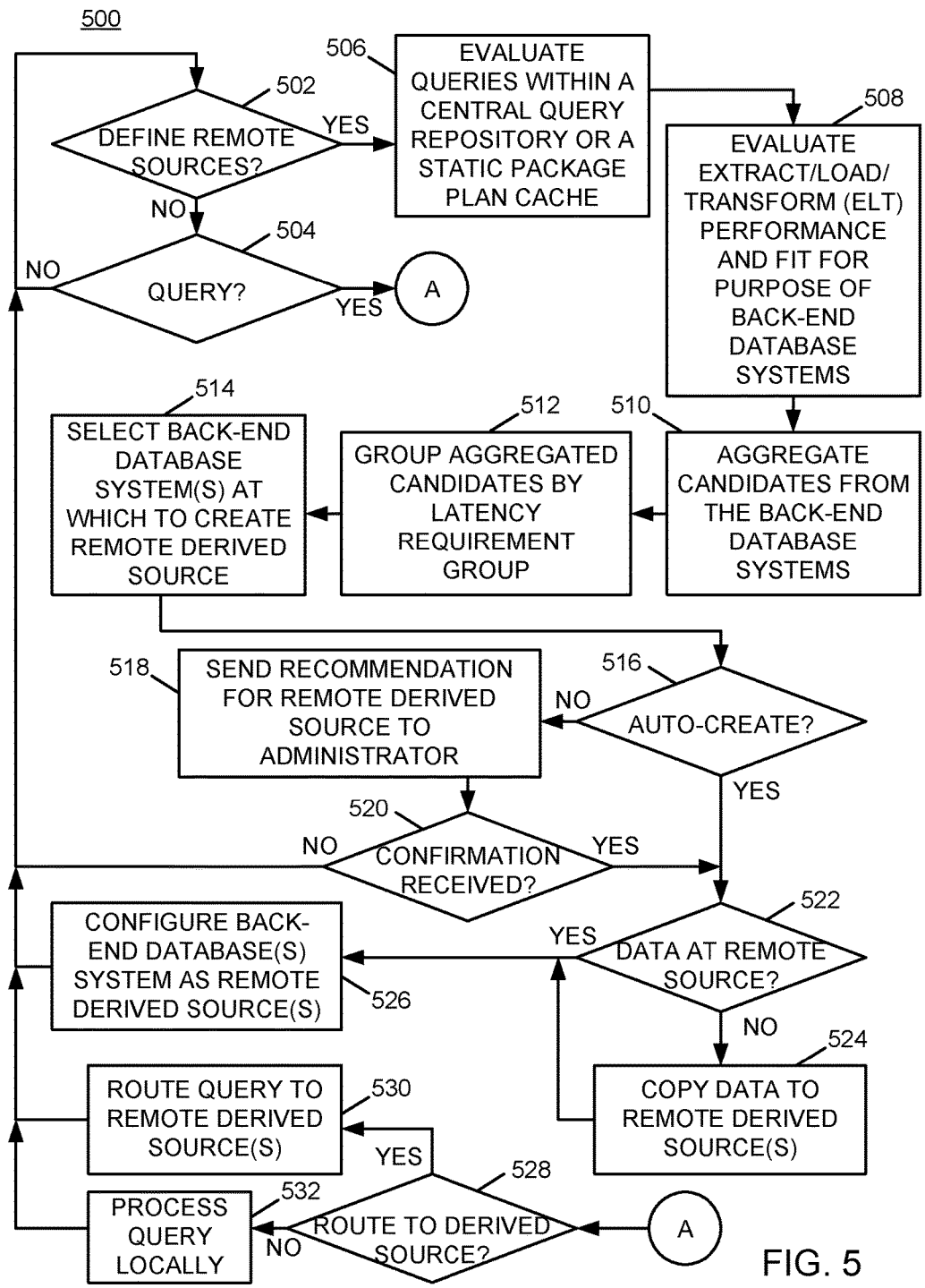
FIG. 5 is a flow chart of an example of an implementation of a process for runtime creation of remote derived sources for query offload that identifies candidates, defines, and creates remote derived sources for mixed query workloads, and that performs real-time processing and re-routing of queries according to an embodiment of the present subject matter.

FIG. 4 through FIG. 5 described below represent example processes that may be executed by devices, such as the core processing module 300, to perform the automated runtime creation of remote derived sources for query offload associated with the present subject matter. Many other variations on the example processes are possible and all are considered within the scope of the present subject matter. The example processes may be performed by modules, such as the optimizer/advisor module 316 and/or executed by the CPU 302, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for automated runtime creation of remote derived sources for query offload. The process 400 represents a computer-implemented method of performing the technical processing described herein, and may be executed by a processor of a central relational database management system (RDBMS) operatively interconnected to one or more back-end database systems. At block 402, the process 400 evaluates, for a mixed query workload that comprises different types of queries, a plurality of different query criteria specified for each of the different types of queries. At block 404, the process 400 dynamically creates for at least one of the different types of queries, based upon the evaluation of the plurality of different query criteria specified for each of the different types of queries of the mixed query workload, at least one remote derived source of data requested by the at least one of the different types of queries using at least one of the one or more back-end database systems that supports remote processing of the at least one of the different types of queries.

FIG. 5 is a flow chart of an example of an implementation of a process 500 for runtime creation of remote derived sources for query offload. The process 500 represents a computer-implemented method of performing the technical processing described herein. The process 500 may identify candidates, define, and create one or more remote derived sources for mixed query workloads that involve different types of queries, and may perform real-time processing and re-routing of queries. The process 500 may be provided as a service in a cloud computing environment.

At decision point 502, the process 500 begins an iterative loop and makes a determination as to whether to begin processing to define one or more remote derived sources. In response to determining not to begin processing to define one or more remote derived sources, the process 500 makes a determination at decision point 504 as to whether a query has been received to process in real time. In response to determining that a query has not been received to process in real time, the process 500 returns to decision point 502 and iterates as described above.

In response to determining at decision point 502 to begin processing to define remote derived source(s), the process 500 begins processing to evaluate queries and query flows. At block 506, the process 500 evaluates queries within one of a central query repository and a static package plan cache and searches for remote derived source opportunities within the queries. This processing may be performed using sets of different query criteria specified for the different types of queries of the mixed query workload. The sets of different criteria specified for the different types of queries may include one or more of differing application-level latency requirements, service level agreement (SLA) requirements, regulatory data storage location requirements, security level requirements, disaster recovery requirements, cost tolerance of establishing the remote derived source, aggregate return on investment (ROI) to allow creation of remote derived sources, and other requirements as appropriate for a given implementation.

At block 508, the process 500 evaluates extract/load/transform (ELT) flows and a "fit for purpose" of the respective back-end database system(s) for handling ELT logic as the remote derived source(s). It should be noted that while block 506 and block 508 are described and shown sequentially in FIG. 5, additional processing logic to select one of the two forms of evaluation may be utilized as appropriate for a given implementation. As such, both forms of evaluation are not required to define remote derived sources.

At block 510, the process 500 aggregates, according to the evaluated different query criteria specified for each of the different types of queries, candidates from the back-end database system(s) for potential use as remote derived sources. At block 512, the process 500 groups the aggregated candidates by latency requirement group based upon latency tolerance. At block 514, the process 500 selects one or more back-end database systems at which to dynamically create at least one remote derived source as one or more of the available/connected back-end database systems with a highest latency tolerance relative to at least one other of the one or more back-end database systems.

At decision point 516, the process 500 makes a determination as to whether to perform automated/programmatic creation of the remote derived source(s). This determination may be made according to a configuration option specified by an administrator regarding administrator interest in feedback and/or involvement in the creation/definition of remote derived sources. Processing in response to an affirmative determination at decision point 516 will be described further below.

In response to determining at block 516 that automated/programmatic creation of the remote derived source(s) is not selected/configured, the process 500 forms and sends, at block 518, a recommendation to a system administrator to create the remote derived source(s) for at least one of a set of different types of queries at one or more of the back-end database systems. The recommendation may also include at least a recommended refresh rate of the data at the remote derived source(s) and a value specified in one of real-time query processing performance improvement and cost savings predicted to result from creation of the remote derived source(s).

The process 500 makes a determination at decision point 520 as to whether a confirmation from the system administrator to create the remote derived source(s) at the back-end database system has been received. In response to determining that a confirmation from the system administrator to create the remote derived source(s) at one or more of the back-end database systems has not been received (e.g., that an instruction not to create this particular remote derived source(s) has been received), the process 500 returns to decision point 502 and iterates as described above.

Alternatively, in response to receiving a confirmation from the system administrator to create the remote derived source(s) at one or more of the back-end database systems at decision point 520, or in response to an affirmative determination at decision point 516 to perform automated/programmatic creation of the remote derived source(s), the process 500 makes a determination at decision point 522 as to whether the data to fulfill one or more queries to be off-loaded to the remote derived source(s) already exists at the specified back-end database system(s). In response to determining at decision point 522 that the data does not already exist at the specified back-end database system(s), the process 500 copies the data to the appropriate back-end database system(s) at block 524.

In response to copying the data to the appropriate back-end database system(s) at block 524, or in response to determining at decision point 522 that the data to fulfill one or more queries to be off-loaded to the remote derived source(s) already exists at the specified back-end database system, the process 500 configures, at block 526, the respective back-end database system(s) as the remote derived source(s). The process 500 returns to decision point 502 and iterates as described above.

The process 500 may iterate to create multiple remote derived sources over time, and may further perform remote derived source management as described above (e.g., refresh, etc.). While not depicted, this additional processing as described above is considered a portion of the process 500.

Returning to the description of decision point 504, in response to determining that a query has been received to process in real time, the process 500 (as noted using the circled symbol of the letter "A") moves to decision point 528 and makes a determination as to whether to route the query to a remote derived source. Because different remote derived sources may have been configured over time, the processing to determine whether to route/re-route a received query may be performed in real time based upon a variety of factors, including local (central RDBMS) real-time CPU occupancy and other factors, and whether a remote derived source has previously been created for the type of query that has been received. Additionally, the process 500 may create a remote derived source in real time in response to receipt of a query if a remote derived source has not been previously created, using the techniques described above, and may route the received query in real time to a newly-created remote derived source. As such, the process 500 may flexibly process queries and remote derived sources in real time according to a variety of factors.

In response to determining at decision point 528 to route the received query to a remote derived source, the process 500 routes the query to the appropriate created remote derived source(s) at block 530. Alternatively, in response to determining not to route the received query to a remote derived source, the process 500 processes the query locally at block 532. In response to the processing at either of block 530 or 532, the process 500 returns to decision point 502 and iterates as described above.

As such, the process 500 both defines remote derived sources for mixed query workloads that involve different types of queries, and may perform real-time processing and re-routing of queries. For creation of remote derived sources, whether in advance of receipt of a particular query or in real time responsive to receipt of a query, the process 500 evaluates a variety of query criteria and processing capabilities of back-end database systems. The process 500 may operate to autonomously create remote derived sources, and may alternatively operate as an adviser to suggest/recommend creation of remote derived sources to system administrators. The process 500 may migrate data and configure back-end database systems as remote derived sources, and may route received queries in real time to remote derived sources.

As described above in association with FIG. 1 through FIG. 5, the example systems and processes provide runtime creation of remote derived sources for query offload. Many other variations and additional activities associated with runtime creation of remote derived sources for query offload are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
   by a processor of a central relational database management system (RDBMS) operatively interconnected to one or more back-end database systems:
      evaluating, for a mixed query workload that comprises different types of queries, a plurality of different query criteria specified for each of the different types of queries; and
      dynamically creating for at least one of the different types of queries, based upon the evaluation of the plurality of different query criteria specified for each of the different types of queries of the mixed query workload, at least one remote derived source of data requested by the at least one of the different types of queries using at least one of the one or more back-end database systems that supports remote processing of the at least one of the different types of queries.

2. The computer-implemented method of claim 1, where the different query criteria specified for each of the different types of queries of the mixed query workload comprise differing requirements selected from a group consisting of application-level latency requirements, service level agreement (SLA) requirements, regulatory data storage location requirements, security level requirements, disaster recovery requirements, and aggregate return on investment (ROI) requirements to allow creation of the at least one remote derived source.

3. The computer-implemented method of claim 1, where evaluating, for the mixed query workload that comprises the different types of queries, the plurality of different query criteria specified for each of the different types of queries comprises one of:
   evaluating, using the plurality of different query criteria, queries within one of a central query repository and a static package plan cache, and searching for remote derived source opportunities within the queries; or
   evaluating extract/load/transform (ELT) flows and a fit for purpose of the at least one of the one or more back-end database systems for handling ELT logic as the at least one remote derived source.

4. The computer-implemented method of claim 1, further comprising:
   aggregating, according to the evaluated plurality of different query criteria specified for each of the different types of queries, candidates from the one or more back-end database systems for potential use as remote derived sources;
   grouping the aggregated candidates by latency requirement group based upon latency tolerance; and
   selecting the at least one of the one or more back-end database systems at which to dynamically create the at least one remote derived source based upon a highest latency tolerance relative to at least one other of the one or more back-end database systems.

5. The computer-implemented method of claim 1, where dynamically creating for at least one of the different types of queries, based upon the evaluation of the plurality of different query criteria specified for each of the different types of queries of the mixed query workload, the at least one remote derived source of the data requested by the at least one of the different types of queries using the at least one of the one or more back-end database systems that supports the remote processing of the at least one of the different types of queries comprises:
   sending a recommendation to create the at least one remote derived source for the at least one of the different types of queries using the at least one of the one or more back-end database systems to a system administrator, where the recommendation comprises at least a recommended refresh rate of the data at the at least one remote derived source and a value specified in one of real-time query processing performance improvement and cost savings predicted to result from creation of the at least one remote derived source; and
   creating the at least one remote derived source in response to receiving a confirmation from the system administrator to create the at least one remote derived source at the at least one of the one or more back-end database systems.

6. The computer-implemented method of claim 1, further comprising routing the at least one of the different types of queries to the created at least one remote derived source.

7. The computer-implemented method of claim 1, where the evaluating and the dynamically creating are provided as a service in a cloud computing environment.

8. A system, comprising:
a communication module; and
a processor of a central relational database management system (RDBMS) operatively interconnected, via the communication module, to one or more back-end database systems and programmed to:
evaluate, for a mixed query workload that comprises different types of queries, a plurality of different query criteria specified for each of the different types of queries; and
dynamically create for at least one of the different types of queries, based upon the evaluation of the plurality of different query criteria specified for each of the different types of queries of the mixed query workload, at least one remote derived source of data requested by the at least one of the different types of queries using at least one of the one or more back-end database systems that supports remote processing of the at least one of the different types of queries.

9. The system of claim 8, where the different query criteria specified for each of the different types of queries of the mixed query workload comprise differing requirements selected from a group consisting of application-level latency requirements, service level agreement (SLA) requirements, regulatory data storage location requirements, security level requirements, disaster recovery requirements, and aggregate return on investment (ROI) requirements to allow creation of the at least one remote derived source.

10. The system of claim 8, where, in being programmed to evaluate, for the mixed query workload that comprises the different types of queries, the plurality of different query criteria specified for each of the different types of queries, the processor is programmed to one of:
evaluate, using the plurality of different query criteria, queries within one of a central query repository and a static package plan cache, and searching for remote derived source opportunities within the queries; or
evaluate extract/load/transform (ELT) flows and a fit for purpose of the at least one of the one or more back-end database systems for handling ELT logic as the at least one remote derived source.

11. The system of claim 8, where the processor is further programmed to:
aggregate, according to the evaluated plurality of different query criteria specified for each of the different types of queries, candidates from the one or more back-end database systems for potential use as remote derived sources;
group the aggregated candidates by latency requirement group based upon latency tolerance; and
select the at least one of the one or more back-end database systems at which to dynamically create the at least one remote derived source based upon a highest latency tolerance relative to at least one other of the one or more back-end database systems.

12. The system of claim 8, where, in being programmed to dynamically create for at least one of the different types of queries, based upon the evaluation of the plurality of different query criteria specified for each of the different types of queries of the mixed query workload, the at least one remote derived source of the data requested by the at least one of the different types of queries using the at least one of the one or more database systems that supports the remote processing of the at least one of the different types of queries, the processor is programmed to:
send a recommendation to create the at least one remote derived source for the at least one of the different types of queries using the at least one of the one or more back-end database systems to a system administrator, where the recommendation comprises at least a recommended refresh rate of the data at the at least one remote derived source and a value specified in one of real-time query processing performance improvement and cost savings predicted to result from creation of the at least one remote derived source; and
create the at least one remote derived source in response to receiving a confirmation from the system administrator to create the at least one remote derived source at the at least one of the one or more back-end database systems.

13. The system of claim 8, where the evaluating and the dynamically creating are provided as a service in a cloud computing environment, and where the processor is further programmed to:
route the at least one of the different types of queries to the created at least one remote derived source.

14. A computer program product, comprising:
a computer readable storage medium having computer readable program code embodied therewith, where the computer readable storage medium is not a transitory signal per se and where the computer readable program code when executed on a computer of a central relational database management system (RDBMS) operatively interconnected to one or more back-end database systems causes the computer to:
evaluate, for a mixed query workload that comprises different types of queries, a plurality of different query criteria specified for each of the different types of queries; and
dynamically create for at least one of the different types of queries, based upon the evaluation of the plurality of different query criteria specified for each of the different types of queries of the mixed query workload, at least one remote derived source of data requested by the at least one of the different types of queries using at least one of the one or more back-end database systems that supports remote processing of the at least one of the different types of queries.

15. The computer program product of claim 14, where the different query criteria specified for each of the different types of queries of the mixed query workload comprise differing requirements selected from a group consisting of application-level latency requirements, service level agreement (SLA) requirements, regulatory data storage location requirements, security level requirements, disaster recovery requirements, and aggregate return on investment (ROI) requirements to allow creation of the at least one remote derived source.

16. The computer program product of claim 14, where, in causing the computer to evaluate, for the mixed query workload that comprises the different types of queries, the plurality of different query criteria specified for each of the different types of queries, the computer readable program code when executed on the computer causes the computer to one of:

evaluate, using the plurality of different query criteria, queries within one of a central query repository and a static package plan cache, and searching for remote derived source opportunities within the queries; or evaluate extract/load/transform (ELT) flows and a fit for purpose of the at least one of the one or more back-end database systems for handling ELT logic as the at least one remote derived source.

17. The computer program product of claim 14, where the computer readable program code when executed on the computer further causes the computer to:

aggregate, according to the evaluated plurality of different query criteria specified for each of the different types of queries, candidates from the one or more back-end database systems for potential use as remote derived sources;

group the aggregated candidates by latency requirement group based upon latency tolerance; and select the at least one of the one or more back-end database systems at which to dynamically create the at least one remote derived source based upon a highest latency tolerance relative to at least one other of the one or more back-end database systems.

18. The computer program product of claim 14, where, in causing the computer to dynamically create for at least one of the different types of queries, based upon the evaluation of the plurality of different query criteria specified for each of the different types of queries of the mixed query workload, the at least one remote derived source of the data requested by the at least one of the different types of queries using the at least one of the one or more back-end database systems that supports the remote processing of the at least one of the different types of queries, the computer readable program code when executed on the computer causes the computer to:

send a recommendation to create the at least one remote derived source for the at least one of the different types of queries using the at least one of the one or more back-end database systems to a system administrator, where the recommendation comprises at least a recommended refresh rate of the data at the at least one remote derived source and a value specified in one of real-time query processing performance improvement and cost savings predicted to result from creation of the at least one remote derived source; and create the at least one remote derived source in response to receiving a confirmation from the system administrator to create the at least one remote derived source at the at least one of the one or more back-end database systems.

19. The computer program product of claim 14, where the computer readable program code when executed on the computer further causes the computer to route the at least one of the different types of queries to the created at least one remote derived source.

20. The computer program product of claim 14, where the evaluating and the dynamically creating are provided as a service in a cloud computing environment.

* * * * *